W. HOUGHTALING & E. SIVITER.
CAM MOTION.

No. 189,223.  Patented April 3, 1877.

Witnesses
John Becker
A. H. Norris

William Houghtaling
Emanuel Siviter
By Brown + Allen
Per J. L. N.  Attys.

UNITED STATES PATENT OFFICE.

WILLIAM HOUGHTALING AND EMANUEL SIVITER, OF BRIDGEPORT, CONN.

IMPROVEMENT IN CAM-MOTIONS.

Specification forming part of Letters Patent No. 189,223, dated April 3, 1877; application filed January 31, 1877.

*To all whom it may concern:*

Be it known that we, WILLIAM HOUGHTALING and EMANUEL SIVITER, both of Bridgeport, in the county of Fairfield and State of Connecticut, have invented certain Improvements in Cam-Motions, of which the following is a specification:

This invention relates to means for communicating motion from grooved cams, for various mechanical purposes or actions. It consists in a divided and adjustable construction of the spherical or partly spherical roller, in connection with means for adjusting the same to compensate for wear and to insure a proper working contact at all times of the roller with the grooved cam.

Figure 1:
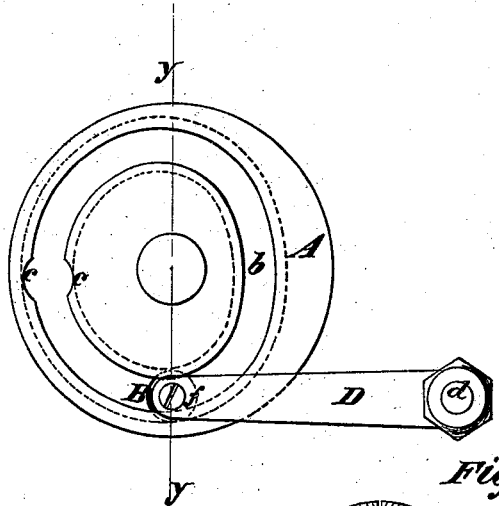
Figure 2:
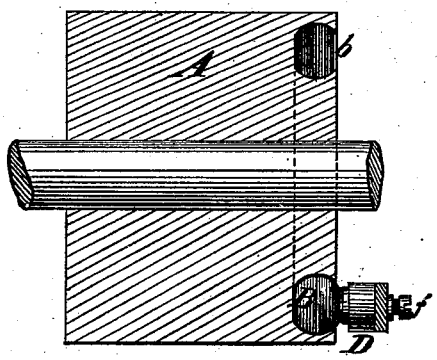
Figure 3:
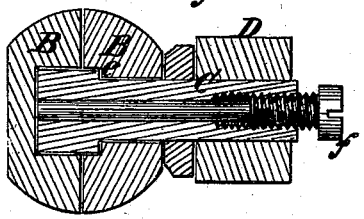

In the drawing, Figure 1 is an outside view, transversely to its axis, of an end or face grooved cam, with a sectionally and adjustably constructed roller attached to an arm or lever in gear therewith; Fig. 2, a section of the same on the line $y\ y$; and Fig. 3, a sectional view, on a larger scale, of the sectionally-constructed roller, together with means for adjusting the same.

In the drawings, A represents a peripherically-grooved cam, the groove $b$ in it being of any suitable shape in direction of its continuity, but with its sides or walls, which are the acting surfaces of the cam, of a concave construction, to receive between and in close contact with them a partly-spherical roller, B, which may be entered within the groove through a cut-away portion, $c\ c$. This roller is free to turn on a pin, C, attached to a carrier-arm or lever, D, hung to rock on or with a pivot, $d$, and from which lever motion, as communicated by the cam through the roller, may be transmitted in various ways and for different purposes. Now, it will be clear that by reason of the spherical contour of the roller B and the correspondingly shaped concave construction of the walls or acting surfaces of the groove $b$, said roller becomes self-adjusting, as regards maintaining its contact with the walls of the groove or acting surfaces of the cam in case of any sagging or deviation from their proper relative or original positions of the cam and roller or arm carrying the latter—as, for instance, by the tilting of the pivot $d$ of the lever D. All binding or cutting of the roller and cam is avoided by said construction of the roller and groove.

To compensate for wear of the roller and walls of the cam, we propose to construct the roller B in sections, and to provide means of adjustment for setting up the roller to its bearings against the concave walls in the groove of the cam. The spherical or partly spherical roller B is divided transversely of its axis into two sections, and the pin C, on which it turns, is formed with a shoulder, $e$, sustaining the one section, and has a screw, $f$, passing longitudinally through it, for the purpose of adjusting or setting out the other section.

We claim—

The cam A, constructed with a groove, $b$, having its sides or walls concave, in combination with the roller B, divided transversely of its axis, the pin C on which the roller turns having a shoulder, $e$, set in a recess between the sections of the roller, the arm or lever D, and the screw $f$ passing longitudinally through the pin C, for adjusting the sections of the roller, substantially as described.

WILLIAM HOUGHTALING.
  EMANUEL SIVITER.

Witnesses:
 C. P. HALL,
 L. S. CATLIN.